Figure 1:
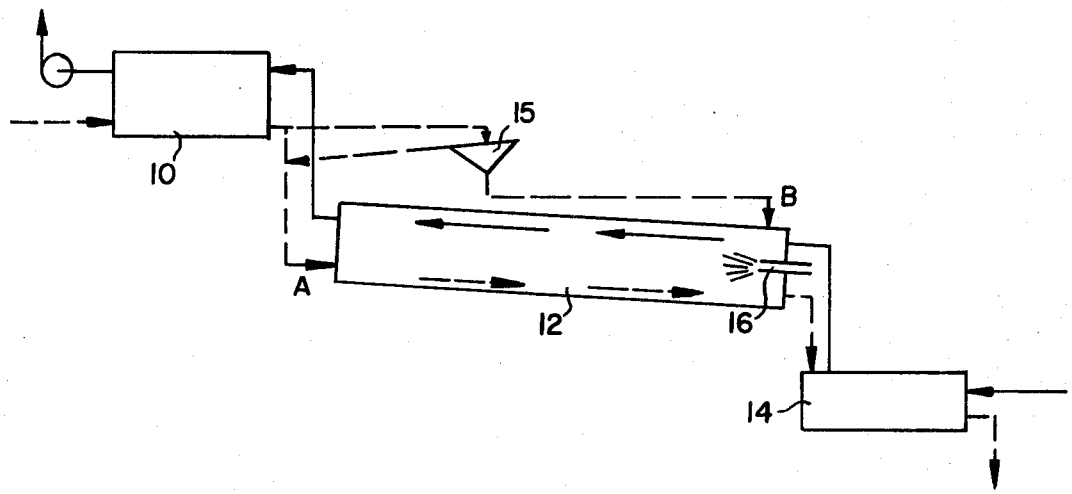

United States Patent [19]

Dambrine et al.

[11] 3,723,597
[45] Mar. 27, 1973

[54] CALCINING PHOSPHATE MINERALS

[75] Inventors: Francis Dambrine, Marcq en Bareel; Gilles Gross, Lille, both of France

[73] Assignee: Fives Lille-Gail, Paris, France

[22] Filed: Jan. 29, 1971

[21] Appl. No.: 110,811

[30] Foreign Application Priority Data

Jan. 23, 1970 France..................................7002404

[52] U.S. Cl. .................................. 423/200, 432/61
[51] Int. Cl................................................F27b 7/02
[58] Field of Search...................................263/32, 53

[56] References Cited

UNITED STATES PATENTS 2,965,366   12/1960   O'Mara et al.......................263/32 R
3,385,580   5/1968    Ruegg................................263/32 R Primary Examiner—John J. Camby
Attorney—Kurt Kelman

[57] ABSTRACT

In calcining phosphate-containing minerals, the temperature of at least a fraction of the mineral delivered to the calcining kiln is rapidly raised from a temperature lower than the normal exothermic reaction temperature of the mineral material to one in excess thereof.

8 Claims, 3 Drawing Figures

PATENTED MAR 27 1973

3,723,597

SHEET 1 OF 2

*INVENTORS.*
FRANCIS DAMBRINE
GILLES GROSS

BY *Kurt Kelman*

AGENT

CALCINING PHOSPHATE MINERALS

The present invention relates to improvements in the calcination of a phosphate or analogous mineral material, which is used to enrich the mineral material by decomposing the carbonates contained therein into their constituent elements which are subsequently removed.

In conventional processes of this type, such mineral materials are dried, then brought to a temperature of about 900° C. to 1,000° C., and calcined by contacting the pulverulent or granular mineral material to be treated with hot gases in countercurrent flow.

It has been found that this conventional calcining treatment gives rise to an exothermic reaction which begins at a temperature of the order of about 400° C. to 600° C. This exothermic reaction is probably due to the combustion of organic matter contained in the mineral material which comes to the surface of the mineral material. The heat produced by this exothermic reaction is utilized, together with a portion of the calories furnished by the burner which produces the hot gases, to dry the mineral material and to raise its temperature to the above-indicated combustion temperature.

If considerable heat is produced by the exothermic reaction, the amount of heat available exceeds that needed for drying and heating the mineral material. However, this excess calories cannot be utilized to raise the temperature of the mineral material above the combustion temperature of the organic matter therein and to calcine the mineral material because the thermal level thereof is too low. As a result, there is a considerable caloric loss and, accordingly, the installation operates at a poor heat efficiency due to the fact that the calcining gases leave the installation at a high temperature and that it is not possible to recover the caloric energy of these gases in the calcining plant.

It is the primary object of this invention to overcome this disadvantageous use of the thermal energy in mineral material treating installations of this type and thus considerably to reduce the consumption of heat energy therein.

The above and other objects are accomplished in accordance with the invention by rapidly raising the temperature of at least a fraction of the mineral material from a temperature lower than the normal exothermic reaction temperatures to one in excess thereof so that, for this fraction, the exothermic reaction proceeds at a temperature higher than the normal exothermic reaction temperature. This is done by introducing the mineral material into a high temperature zone of the calcining installation.

Throughout the specification and claims, the term "normal exothermic reaction temperature" means the average temperature at which the major portion of the mineral material reacts when the temperature of the material is slowly raised, it being understood that the reaction begins at a temperature lower than this "normal" temperature and proceeds at temperatures in excess of such "normal," i.e., average, temperature of reaction.

According to the invention, the calories liberated by the exothermic reaction at a temperature higher than the normal reaction temperature are utilized to calcine the mineral material and possibly to raise the temperature of the remaining fraction of the mineral material above the normal exothermic reaction temperature, which makes it possible to reduce the consumption of the burner.

The temperature of the mineral material before its introduction into the high temperature zone, the temperature in this zone and the quantity of the fraction of the mineral material to be introduced thereinto depend on the treatment conditions and the type of mineral material to be treated. The optimum choice of these parameters will be readily established by those skilled in the art without undue experimentation so as to recover at least a major part and possibly all of the exothermic reaction heat energy.

The fraction of the mineral material introduced into the high temperature zone is preferably classified so that only particles of minimum size are used, such small particles presenting a minimum thermal inertia and thus permitting rapid heating thereof.

The installation of the present invention comprises a drying chamber for the mineral material, a tubular rotary kiln, and a cooling chamber. The mineral material and the heating gases may be circulated countercurrently through the kiln, a fraction of the material being removed before the mineral material is introduced into the kiln at one end thereof and this fraction being circulated and introduced into the kiln at the other end thereof where the burner is positioned so that the fraction of the mineral material passes through a high temperature zone adjacent the burner.

It is possible either to use a long rotary kiln for heating and calcining the mineral material or a pre-heater for heating the material and a short rotary kiln where the pre-heated mineral material is calcined. In the latter case, a fraction of the mineral material is removed from the preheater and circulated to the end of the kiln where the burner is positioned.

It is also possible to circulate the mineral material and the heating gases concurrently, i.e., in the same direction, through the kiln, in which case the burner is positioned at the same end of the kiln at which the material is introduced thereinto. In this case, the total mineral material charge is rapidly brought to a high temperature when it enters the kiln, and the freed calories produced by the combustion of organic matter in the mineral material are used to calcine the mineral material.

This invention is applicable to the calcination of mineral material containing phosphates as well as other mineral materials whose thermal treatment produces an exothermic reaction liberating a quantity of heat at a temperature lower than the maximum temperature of the treatment.

Figure 2:
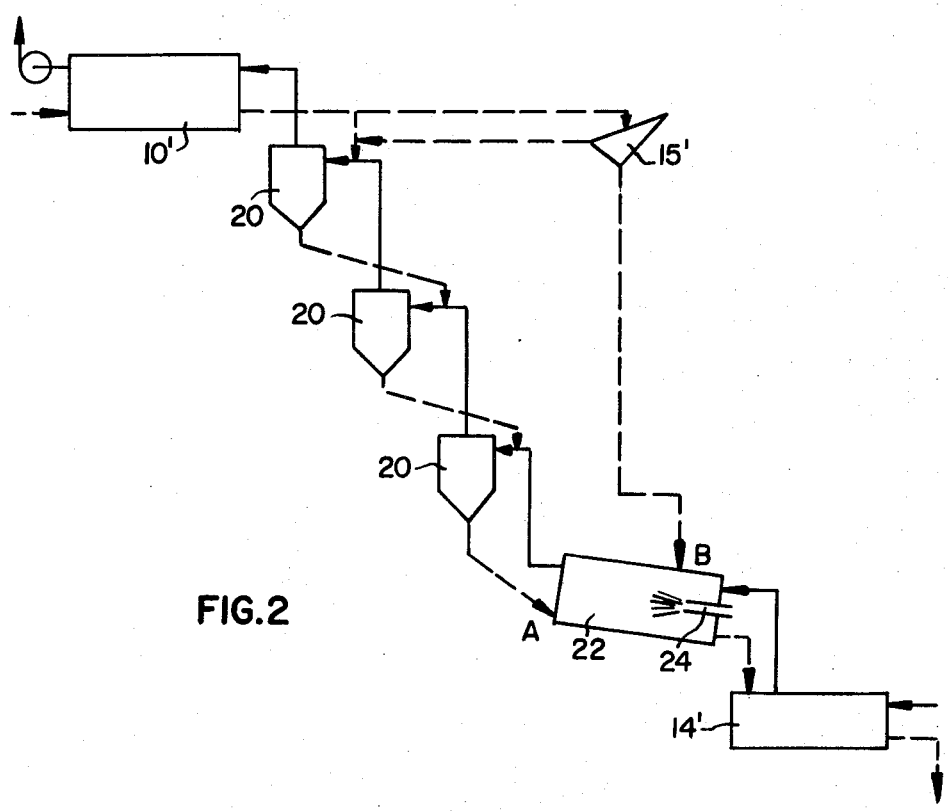
Figure 3:
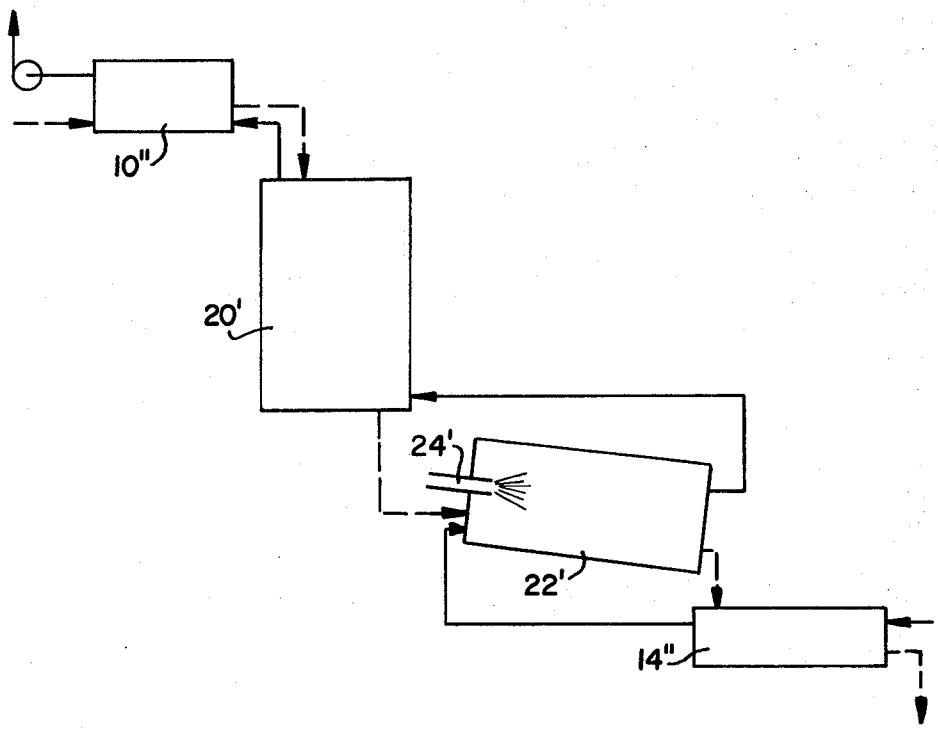

The above and other objects and advantages of the present invention will become more apparent from the following detailed description of certain now preferred embodiments thereof, taken in conjunction with the accompanying drawing wherein FIGS. 1 to 3 schematically illustrate three different installations according to the invention and useful in the process thereof.

Referring now to the drawing and first to FIG. 1, there is shown a drying chamber 10. The drier may be of any known type used for drying particulate mineral material, whether pulverulent or granular. The installation also comprises a long tubular rotary kiln 12, a cooling chamber 14 of any known type, and a conventional classifier 15 for particulate material. Each apparatus in this installation (and in the embodiments shown in FIGS. 2 and 3) may be of conventional structure, and the present invention is not concerned with their structural features.

A burner 16 is positioned at the output end B of the kiln whence the calcined mineral material is discharged. The hot gases produced by the combustion of a combustible fuel in the burner circulate through the kiln in a direction counter-current to the direction of flow of the major portions of the mineral material introduced into the kiln at input end A, the direction of flow of the hot gases being shown by the arrows in full lines while the direction of flow of the mineral material is indicated by the arrows in broken lines.

As shown, the mineral material is first introduced into the drying chamber 10 where the hot gases exhausted from the kiln are used to dry and pre-heat the material. The material is heated in the drying chamber 10 to a temperature of about 400° C. to 600° C. and the gases which enter the chamber at a temperature of about 1,000° C. to 1,200° C. are exhausted from the drying chamber into the atmosphere at a temperature of about 120° C.

As the dried and pre-heated mineral material leaves the drying chamber 10, a portion thereof is introduced into the kiln at input end A which is opposite output end B where the burner 16 is positioned. Another portion of the material is, however, separated from the dried and pre-heated material and directed to the classifier 15 where this other portion is separated into a coarse fraction and a fine fraction. The coarse fraction is returned to the first portion of the mineral material and enters the kiln at input end A. The fine fraction of the mineral material is introduced in the kiln at output end B of the kiln where the burner is positioned.

As the portion of the mineral material introduced at end A moves through the kiln towards output end B, it is heated to progressively higher temperatures until it reaches the calcining temperature of, say, about 950° C. When the mineral material reaches a temperature of the order of about 400° C. to 600° C., an exothermic reaction occurs, which presumably is due to the presence of organic matter in the material and its combustion at this temperature level. This exothermic reaction liberates calories which are exhausted by and with the gases circulating through the kiln in a direction countercurrent to the flow of the mineral material therethrough. These calories are then utilized to dry and pre-heat the mineral material in drying chamber 10 and thus to bring the portion of the mineral material introduced through input end A of the kiln to the temperature at which the exothermic reaction takes place.

As the mineral material proceeds through the kiln, its temperature is raised to about 950° C. to 1,000° C., at which temperature it is calcined. The calories necessary to raise the temperature of the mineral material from the combustion temperature of the organic matter contained therein to the calcining temperature thereof and to effectuate the decarbonization are produced by burner 16 and by the exothermic reaction produced in the fraction of the mineral material introduced in the high temperature zone of the kiln adjacent to end B. The secondary air necessary for the combustion is at least partially provided by the hot air coming from cooling chamber 14 at a temperature of about 500° C. to 600° C.

The total charge of the mineral material introduced into the kiln is discharged at output end B of the kiln and conveyed into the cooling chamber 14 where cold air is introduced to contact the calcined material and lower its temperature from about 850°-950° C. to about 120° C., the heat exchange between the cold air and the hot mineral material raising the temperature of the air so that it provides a source of hot combustion air for the kiln, as hereinabove described and shown in FIG. 1.

Since the mineral material fraction which enters the kiln at output end B is in a high temperature zone adjacent the burner 16, this fraction of the material is rapidly heated to a temperature in excess of that at which the exothermic reaction normally proceeds. Consequently, the calories liberated by this reaction at the elevated temperature can be utilized to satisfy the thermal energy requirements of the decarbonization reaction and possibly also to help bring the temperature of the mineral material portion introduced at kiln end A to the calcining temperature. To obtain this goal, it is obviously necessary for the temperature of the mineral material fraction introduced at end B to be below that at which an exothermic reaction would take place in this fraction beyond possibly a very small percentage thereof. This is what is meant by the temperature of this fraction being lower than the normal temperature of exothermic reaction.

It is also possible to utilize the major portion or all of the calories liberated by the exothermic reaction of the mineral material and thus to reduce to a minimum the calorific consumption of the installation.

Only small particles are introduced at B into the high temperature zone of the kiln because they have a minimum thermal insertia, i.e., they may be heated very rapidly to their core to the calcining temperature despite the fact that their dwell time in the kiln is very short.

In the embodiment of the installation shown in FIG. 2, the long tubular rotary kiln of FIG. 1 is replaced by a preheater arrangement consisting of a battery of cyclones 20 and a short rotary kiln 22 equipped with burner 24 at the output end B thereof, opposite to input end A which receives the pre-heated mineral material from the pre-heater arrangement. The calcined material is cooled in cooling chamber 14'. The operation of this installation is analogous to that described hereinabove in connection with the installation of FIG. 1 and being self-evident from the drawing wherein the flow of the mineral material is again shown by the arrows in broken lines while the flow of the hot gases is shown in full lines.

The mineral material coming from drying chamber 10' is conveyed to classifier 15' whence the fine fraction of the material is directed into end B of the kiln while a coarse fraction is introduced at a temperature of about 100° C. into the pre-heater arrangement 20 where the temperature of the material is progressively raised to a range of 600° C. to 800° C. by the hot gases exhausted from kiln 22 and counter-currently circulated through the cyclones of the pre-heater arrangement. A portion of the calories needed to dry and pre-heat the mineral material is provided by the exothermic reaction produced in the later stages of the pre-heater arrangement and possibly at the input end of kiln 22. The gases exhausted from kiln 22 at a temperature of about 900°–1,000° C. pass through the pre-heater arrangement and are finally introduced into the drying chamber 10' at a temperature of about 600°–800° C. whence they are exhausted into the atmosphere at a temperature of about 120° C.

The short kiln in this installation is used almost exclusively for calcining the mineral material. The calories required to bring the mineral material coming from the preheater arrangement to the calcining temperature (about 850°–950° C.) are provided partly by burner 24 and partly by the exothermic reaction which the fraction of the mineral material introduced at B undergoes in the kiln.

Of course, instead of separating the fraction of the mineral material introduced at output end B of the kiln at the output end of the drying chamber, as shown in FIG. 2, this could be done at the output end of the preheater arrangement or at any of its stages.

While this installation has all the advantages of the embodiment of FIG. 1, it has the added advantage of having a higher thermal efficiency because the heat exchange is more efficient in the cyclone pre-heater arrangement than in the front portion of kiln 12 serving to pre-heat the material before it is calcined.

FIG. 3 shows yet another embodiment of an installation according to the present invention. The individual apparatus used in this embodiment may be the same as that of FIG. 2 but the kiln 22' has been turned around in the installation so that the burner 24' is positioned at the input end of the kiln. In this embodiment, the entire charge of the mineral material coming from drying chamber 10'' and pre-heater arrangement 20' is introduced into the kiln in the high temperature zone of the kiln, the hot gases and the mineral material flowing through the kiln in the same direction, and the calcined material being cooled in cooling chamber 14''. Since the operation of this installation is generally analogous to those previously described and is evident from the drawing, a detailed description thereof is not required.

In this installation, the mineral material leaves the pre-heater arrangement 20' at a temperature of about 400°–500° C. and, since it is introduced into the high temperature zone of the kiln adjacent the burner 24', its temperature is rapidly raised. The exothermic reaction consequently is produced primarily at a temperature higher than the normal exothermic reaction temperature of the material. The calories provided by this combustion, therefore, have a thermal level superior to that in conventional calcining installations of this type where the material and the hot gases flow counter-currently through the calcining kiln. Consequently, these calories may be utilized to effectuate at least partly the decarbonization of the mineral material. Therefore, this embodiment, too, permits the calorific consumption of the installation to be reduced.

By way of example, the following mineral raw material was subjected to calcining in the installation of the type hereinabove described and illustrated, the material called "Youssoufia Noir" coming from mineral deposits in Morocco and having the following chemical analysis:

| | Raw | Weight% Calcined |
|---|---|---|
| $P_2O_5$ | 30.32 | 33.78 |
| Calcium phosphate | 66.03 | 73.81 |
| CaO | 50.59 | 56.49 |
| $CO_2$ | 6.49 | 0.46 |
| $SiO_2$ | 3.63 | 2.76 |
| F | 3.69 | 4.09 |

It will be noted that, according to the invention, at least a fraction of the mineral material is introduced into a high temperature zone of the kiln at a temperature below the normal exothermic reaction temperature of the material and the temperature of the material is rapidly or abruptly raised in this zone above this normal exothermic reaction temperature, the terms "rapidly" and "abruptly" being interchangeable for purposes of this invention.

What we claim is:

1. A process for calcining a mineral material which undergoes an exothermic reaction at a temperature below the calcining temperature of the mineral material, comprising the step of rapidly raising the temperature of at least a fraction of the mineral material from a temperature lower than the normal exothermic reaction temperature of the mineral material to one in excess thereof whereby the exothermic reaction in said fraction of the mineral material proceeds at said higher temperature, and calcining the mineral material.

2. The process of claim 1, wherein the mineral material is subjected to a thermal treatment by contacting the material with hot gases in countercurrent flow whereby the material passes through successively hotter treatment zones and the temperature of the material is removed in one of the treatment zones where the temperature of the mineral material is below the normal exothermic reaction temperature and reintroduced into another one of the treatment zones where the temperature thereof is rapidly raised to said higher temperature.

3. The process of claim 2, wherein the fraction of the mineral material is classified after removal into a coarse and a fine portion, the coarse portion is recirculated to the one treatment zone and the fine portion is re-introduced into the other treatment zone.

4. The process of claim 1, wherein the mineral material is dried and the dried material is introduced into a thermal treatment zone at a temperature below the normal exothermic reaction temperature of the material, the temperature of the treatment zone being higher than the normal exothermic reaction temperature for rapidly raising the temperature of the material, and the material whose temperature has been raised is subjected to calcining by contact with hot gases flowing in the same direction as the material.

5. The process of claim 1, wherein the mineral material is a phosphate-containing material in particulate form.

6. An installation for calcining a mineral material which undergoes an exothermic reaction at a temperature below the calcining temperature of the mineral material, comprising pre-heating apparatus for pre-heating the mineral material, a rotary calcining kiln having an input end and an output end, a burner positioned at one of the kiln ends and producing hot gases flowing through the kiln, said one end of the kiln being connected to the pre-heating apparatus and receiving at least a fraction of the mineral material therefrom, and a cooling apparatus connected in series to the output end of the kiln and receiving the calcined mineral material therefrom.

7. An installation for calcining a mineral material which undergoes an exothermic reaction at a temperature below the calcining temperature of the mineral material, comprising pre-heating apparatus for pre-heating the mineral material, means for removing a fraction of the pre-heated material from the pre-heating apparatus, a rotary calcining kiln having an input end and an output end, the means for removing the fraction of the pre-heated material being arranged intermediate the pre-heating apparatus and the kiln, a classifier for separating the removed fraction of the mineral material into a coarse and a fine portion, means for directing the coarse portion to the input end of the kiln, a burner positioned at the output end of the kiln and producing hot gases flowing through the kiln, and a cooling apparatus connected in series to the output end of the kiln and receiving the calcined mineral material therefrom.

8. An installation for calcining a mineral material which undergoes an exothermic reaction at a temperature below the calcining temperature of the mineral material, comprising pre-heating apparatus for pre-heating the mineral material, a rotary calcining kiln having an input end and an output end, the input end being connected in series to the pre-heating apparatus and receiving pre-heated mineral material therefrom, a burner positioned at the input end of the kiln and producing hot gases flowing through the kiln in the same direction as the mineral material, and a cooling apparatus connected in series to the output end of the kiln and receiving the calcined mineral material therefrom.

* * * * *

UNITED STATES PATENT OFFICE
CERTIFICATE OF CORRECTION

PATENT NO. : 3,723,597
DATED : Mar. 27, 1973
INVENTOR(S) : Francis Dambrine et al It is certified that error appears in the above-identified patent and that said Letters Patent are hereby corrected as shown below:

Claim 2, line 6, after "material" insert --is progessively increased, and said fraction of the material--.

Claim 7, line 14, after "kiln," insert --means for directing the fine portion to the output end of the klin,--.

Signed and Sealed this

Third Day of October 1978

[SEAL]

Attest:

RUTH C. MASON
Attesting Officer

DONALD W. BANNER
Commissioner of Patents and Trademarks